June 20, 1950 P. HALPERT 2,511,846
AUTOMATIC PILOT FOLLOW-UP CONTROL
Filed May 3, 1943 2 Sheets-Sheet 1
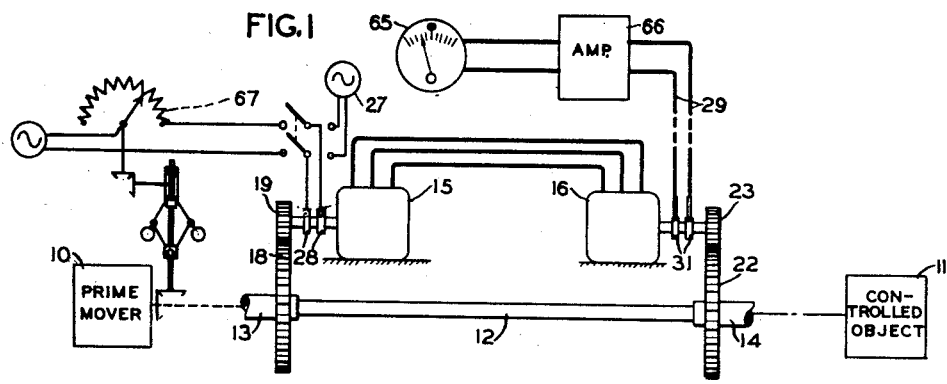
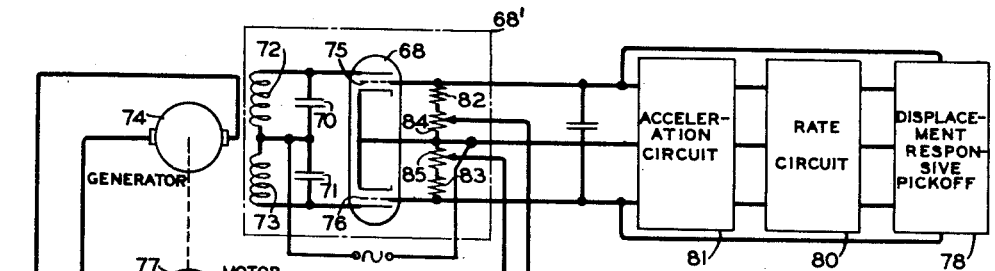
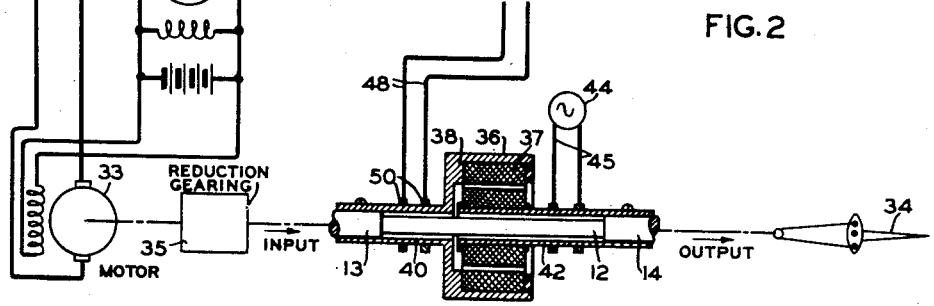
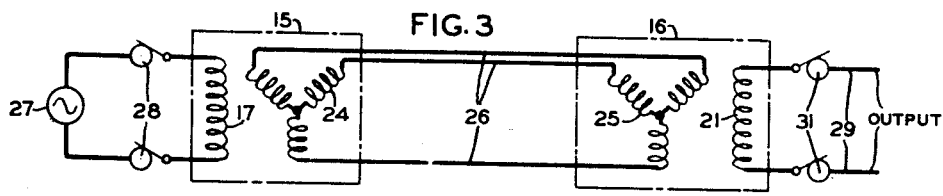
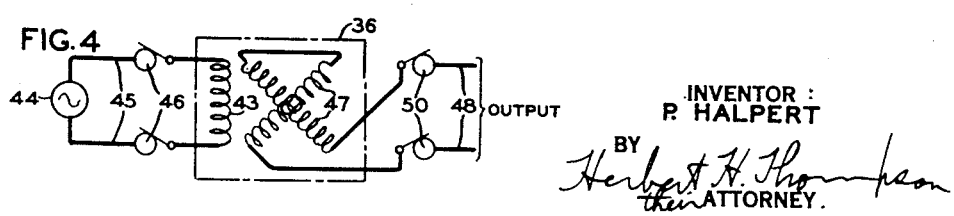
INVENTOR:
P. HALPERT
BY
Herbert H. Thompson
ATTORNEY.

June 20, 1950  P. HALPERT  2,511,846
AUTOMATIC PILOT FOLLOW-UP CONTROL
Filed May 3, 1943  2 Sheets-Sheet 2
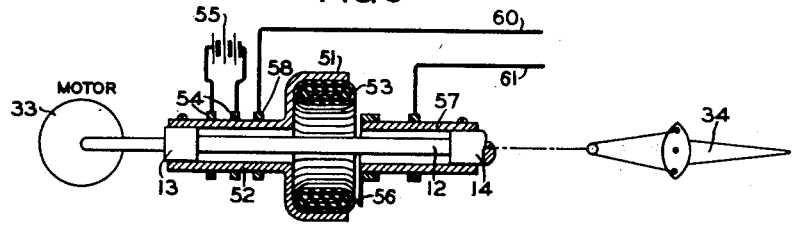
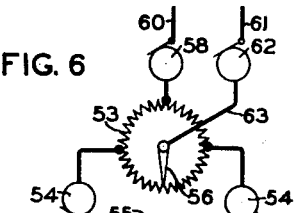
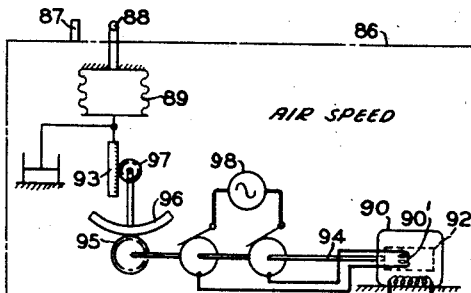
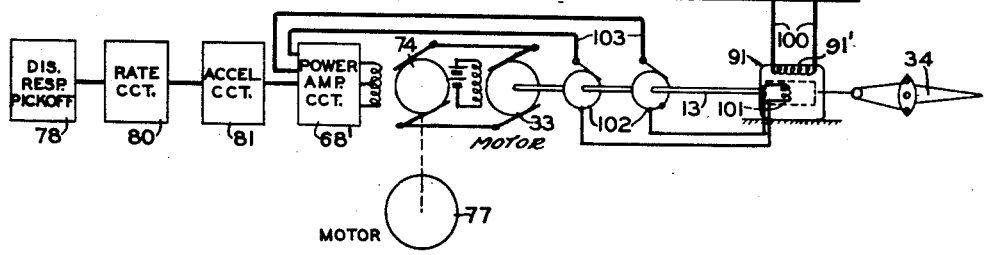
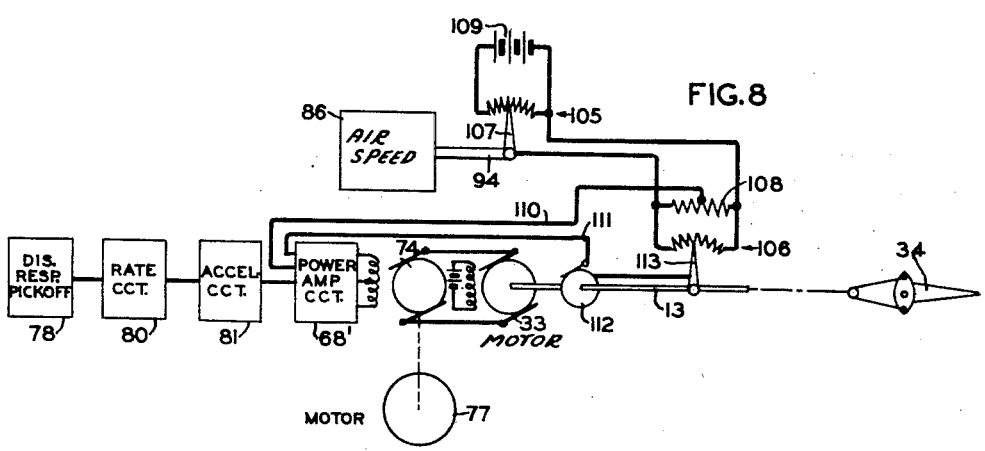
INVENTOR:
P. HALPERT
BY Herbert H. Thompson
ATTORNEY Patented June 20, 1950

2,511,846

UNITED STATES PATENT OFFICE 2,511,846

AUTOMATIC PILOT FOLLOW-UP CONTROL

Percy Halpert, Kew Gardens, N. Y., assignor to The Sperry Corporation, a corporation of Delaware Application May 3, 1943, Serial No. 485,546

15 Claims. (Cl. 318—489)

This invention relates generally to transmission systems in which angular displacement occurs in proportion to the load thereon. More particularly, the invention is concerned with the inclusion of an electrical means in the system that produces an output signal whose magnitude is in proportion to the force required to obtain a desired angular movement in the resistance offering system.

One of the objects of the invention is to utilize the signal output of an electrical transmission system of this character to provide a torque follow-up device for an automatic pilot for dirigible craft to insure that the control surfaces thereof properly respond to a given actuating signal.

Another object of the invention is to control the movable object of the system by the difference between the actuating signal therefor and the torque follow-up signal.

A further object of the invention is to provide an equivalent force or torque follow-up or degenerative signal by means of a follow-back signal proportional to the angular displacement of the driven object (for example, the rudder), modified by a factor variable with the air speed of the craft. Since the back pressure or reaction on the rudder or other control surface of an aircraft, and therefore the torque required to move the same, varies not only with the angular displacement of the rudder but also with the air speed, by combining these two factors we obtain a follow-back generally equivalent to a pressure force or torque follow-back.

A still further object of the invention is to provide a resultant signal for controlling the operation of the movable object composed of a controlling input signal having displacement, rate and acceleration components and an opposing follow-up signal that is proportional to the displacement of the object.

It is a further object of the present invention to provide a control system for the movable control surface of a dirigible craft in which the motor for moving said control surface is controlled by a plurality of signals comprising a displacement signal which varies with departure of the craft from its normal attitude or heading, a rate signal which varies with the rate of change of attitude or heading and a displacement repeat-back signal which is proportional to the extent of movement of the control surface, the controlling signal for the motor being the resultant signal obtained by combining the displacement and rate signal and opposing this combination by the displacement repeat-back signal.

Other objects and structural details of the invention will be apparent from the following description when read in relation to the accompanying drawings, wherein Fig. 1 is a schematic view showing a signal-producing means constructed in accordance with the present invention.

Fig. 2 is a schematic view and circuit diagram showing a modification of the improved signal follow-up producing means incorporated for use with an automatic pilot.

Fig. 3 is a wiring diagram of the signal-producing means illustrated in Fig. 1.

Fig. 4 is a wiring diagram of the signal-producing means illustrated in Fig. 2.

Fig. 5 is a vertical section of a modified form of the signal-producing means.

Fig. 6 is a wiring diagram of the signal-producing means illustrated in Fig. 5.

Fig. 7 is a schematic view along the lines shown in Fig. 2 illustrating a further modification of the invention as applied to automatic pilot systems, and Fig. 8 is a view similar to Fig. 7 showing a modified form of signal-producing means in the follow-up circuit of the automatic pilot system.

With reference to Fig. 1, a transmission system in which the improved signal-producing means is incorporated includes any prime mover 10, such as an engine or motor, and a resistance-offering object 11 that is controlled by the prime mover. The connecting means employed between the prime mover and controlled object is shown as a shaft 12 which has a portion thereof reduced in cross-sectional area to provide a twistable connection whose input end 13 and output end 14 are angularly displaceable in proportion to the torque required of the prime mover to drive the controlled object. Expressed in a different manner, the magnitude of the angular displacement or distortion of the connecting means may be considered to be proportional to the force that offers resistance to the movement of the controlled object. It will be understood that the flexible shaft 12 or other yielding connection employed is not loaded beyond its elastic limit. When utilized in connection with an automatic pilot, the yielding connection is placed as near as possible to the control surface to eliminate the effects of friction in the cable system.

The signal-producing means illustrated in this form of the invention consists of an electrical couple constituted by a transmitter selsyn instrument 15 and a receiver selsyn instrument 16, which are preferably connected to operate as a selsyn signal generator giving an output reversible in phase with the direction of the relative displacement, and variable in magnitude with the amount of displacement. With reference also to Fig. 3, the single-phase wound rotor 17 of the transmitter 15 is angularly positioned or driven from the input end 13 of the connecting means by way of the meshing gears 18 and 19. Similarly, the rotor 21 of the receiver 16 is controlled by way of the gears 22 and 23 from the opposite end of the connecting means which in this instance is the output end 14 thereof. The respective stator windings 24 and 25 of the selsyn instruments are connected by leads 26. Means such as an alternating current source 27 is employed to energize the transmitter selsyn 15, current flowing by way of the slip rings 28 to the rotor winding 17 in the present instance. The signal derived from the couple is obtained from the rotor winding 21 of the receiver selsyn 16 whenever it is out of alignment with the rotor of the transmitter, and is fed to the output leads 29 through slip rings 31. The two movable parts, the rotors 17 and 21 of the electrical signal producing couple, are arranged to give a zero signal when the load on the shaft is zero or the angular deflection between the axially spaced positions on the power shaft to which the parts are connected is zero. If the shaft is now loaded through the reaction of a force on the controlled object against the operation of the prime mover 10, a phase-sensitive output signal is obtained from the signal-producing means whose magnitude is proportional to the angular displacement between input position 13 and output position 14 of the connecting means on the power-transmitting shaft.

In the modified form of transmission system shown in Fig. 2, an electric motor 33 is shown as the prime mover and a control surface such as an aircraft elevator 34 is shown as the controlled object. Twistable shaft 12 linked to the control surface 34 is connected to the motor 33 through means of suitable reduction gearing 35. In the present instance, the signal-producing means is a single selsyn transformer 36, of which the stator and rotor are respectively positioned by one or the other of shafts 13 or 14. The stator 37 may be formed in an open-sided housing 38, the closed side of which is integral with a sleeve 40. One end of the sleeve 40 is anchored in a suitable manner to the input shaft 13. The rotor 41 of the selsyn instrument is mounted on a sleeve 42 that is anchored to the shaft 14, the axes of shaft 12, sleeves 40 and 42 being coincident.

In this form of the invention, the rotor winding 43 is energized from alternating current source 44 by way of leads 45 and slip rings 46. The signal output is obtained from the two-phase stator winding 47 of the selsyn instrument which supplies the output leads 48 by way of slip rings 50. The signal generator 36 may be of any desired conventional construction such as of the selsyn or "Telegon" type, and the foregoing is true also of the various transmitter or receiver units illustrated herein. At no load or torque, the windings of the selsyn instrument are balanced in opposition to produce a zero signal. When the motor 33 is moving the surface 34, displacement between the stator and rotor parts of the selsyn instrument occurs as permitted by the deflection or twist of the shaft 12 due to the load. A phase-sensitive voltage whose magnitude is proportional to the load or resistance offered by the control surface to movement is consequently obtained across the ouput leads 48.

With reference to Figs. 5 and 6, a further modified form of follow-up signal-producing means is shown that includes a movable potentiometer indicated generally at 51. The housing for the potentiometer is mounted on a sleeve 52 fixed to the input position 13 of the connecting means. The resistor 53 of the potentiometer may be supplied with direct current energy by way of slip rings 54 from a source 55. The other moving part of the signal-producing couple is the arm 56 of the potentiometer which contacts the resistor 53. Arm 56 is mounted on a sleeve 57 controlled from the output position 14 of the connecting means. The output of the signal producer is of reversible polarity, in this instance, being obtained by a center tap connection to the resistor 53 leading to slip ring 58 and output lead 60, and a connection to the arm 56. Output lead 61 is connected to arm 56 by way of slip ring 62 and lead 63. At no load, arm 56 is positioned diagonally opposite the center tap connection leading to output lead 60 so that the resistor 53 provides a balanced direct current bridge, and no current flows in the output circuit. When angular deflection occurs between the axially spaced input and output positions 13 and 14, the arm and potentiometer resistor move relative to one another to unbalance the bridge and provide an output that is proportional in magnitude to the angular deflection.

As shown in connection with the form of the invention illustrated in Fig. 1, a torque-measuring meter 65 with a suitably calibrated dial may receive the output of the electrical signal-producing couple by way of amplifier 66. With an input alternating current signal from source 27 of constant voltage to the producing means, the system may be employed to ascertain the torque exerted at the controlled object by the prime mover. The same system may be energized to measure shaft horsepower by changing the calibrations of the meter 65 and providing a source of variable voltage input for the electrical means which may be automatically varied in relation to the speed of the shaft. A speed governor controlled variable resistor 67 may be utilized in the input circuit in this connection.

When employed as a follow-up control for an automatic pilot of dirigible craft, the system insures that the control surface or object responds in accordance with an input control signal that actuates the servomotor 33 or prime mover. A controlling input signal circuit of the character shown and described in Patent No. 2,415,819, dated February 18, 1947, to P. Halpert, C. A. Frische, J. L. Bird and O. E. Esval or in Patent No. 2,398,421, dated April 16, 1946, to C. A. Frische, G. P. Bentley and P. Halpert may be employed. The present application is a continuation-in-part of the last noted patent by the inventor Halpert, the continued portion thereof pertaining to the system including the displacement pick-off at the control surface shown in Fig. 2 of Patent No. 2,398,421. The primary control signal is usually derived from a pick-off or signal generator responsive to relative angular displacement between the craft on which the automatic pilot is mounted and a reference gyroscope, element 31 in Fig. 2 of Patent No. 2,398,421, this primary control signal being usually termed a displacement signal, which is used to control the heading or stability of the craft through a servomotor operating the rudder or the control surface.

In the type of automatic pilot system shown, the output currents of electron tube 68 are smoothed by condensers 70, 71 and energize the field windings 72 and 73 of generator 74, which form the load on, and are matched in impedance to, the sections of tube 68. Windings 72 and 73 are identical, and the sections of tube 68 are balanced so that equal currents will flow in the windings with zero input to the tube. Tube 68 is also operated at the center of the linear portion of the grid characteristic. Under these conditions the effects of the two windings 72, 73 cancel one another. When an input voltage is applied to the grids 75, 76 of the tube 68, as hereinafter described, the current through one winding 72 or 73 will increase and that through the other will decrease, producing a net magnetic field whose magnitude and polarity correspond to the magnitude and polarity of the input signal. This power amplifier circuit is indicated generally at 68'. The armature of generator 74 is driven at a constant speed by a motor 77. The voltage output derived from the armature of generator 74 is fed to the armature of direct current motor 33 and is of a polarity and magnitude dependent upon the magnitude and polarity or phase sense of the input signal to the power amplifier. The fixed field of the motor 33 is, of course, supplied from a suitable source of energizing current such as the battery as shown. The armature resistance of the motive means 33 is matched to that of the generator 74, including the effect of armature reaction, so as to provide maximum power transfer therebetween. Hence, motor 33 will turn at a speed corresponding to the voltage output of generator 74 and in a direction corresponding to the phase of the input signal voltage.

In accordance with the teaching of the heretofore noted application, the input controlling signal to the grids of tube 68 may be combined voltages derived from a displacement responsive gyroscopically actuated primary pick-off 78, a rate circuit 80 which provides an output in accordance with the rate of change of the signal from the primary pick-off, and an acceleration circuit 81 which provides an output in accordance with the rate of rate of change or acceleration of the signal of the primary pick-off, the additively combined signals being applied across the load resistors 82 and 83. By such means the motor driven object is controlled in proportion to an electrical input signal. In the present instance variable resistors 84 and 85 which form a part of the load on the input signal circuits are employed to variably introduce the output of the follow-up signal-producing means to control the operation of the motor 33. The follow-up signal is applied in opposition to the input controlling signal and insures that the surface 34 responds in accordance with the, in this instance, combined input controlling signal.

In the operation of the system, the input control signal is effective to energize motor 33 and move the control surface 34 correspondingly. As such movement occurs, the surface 34 offers an increasing resistance which is reflected back in the output of the follow-up signal-producing means to further control motor 33. As long as there is a net pressure on the control surface there will consequently be a signal that is effective to control motor 33 in a direction that restores the surface to a position in which the pressures on the respective sides thereof are balanced. The follow-up signal which is opposingly combined with the input controlling signal is proportional to the torque exerted by the motor or motive means employed. As far as the pilot system is concerned, it will be understood that other means than that shown in the drawing may be employed to produce a signal that is proportional to the torque applied to the control surface.

An equivalent form of force or torque follow-up for an automatic pilot system is shown in Fig. 7, in which a surface displacement signal is employed with an adjustment thereof for the air speed of the craft. The pilot system disclosed in this system and in Fig. 8 is similar to that described in connection with Fig. 2 and corresponding parts thereof are designated by like reference numbers. In the modified form of follow-up pilot control shown in Fig. 7, two selsyn type instruments 90 and 91 are employed, preferably connected as induction regulators, in which only one of the normally three windings of the stator element of each is employed, said windings being shown at 90' and 91', respectively. In this instance, the rotor 92 of instrument 90 is controlled in accordance with the air speed of the craft through means of a dynamic pressure measuring device generally indicated at 86. Such a device may consist of a Pitot static line 87 and a Pitot dynamic line 88 which leads to bellows 89. The bellows-controlled damped rack 93 positions the shaft 94 on which the rotor 92 is located through means of gear 95, sector 96 and gear 97. Rotor 92 is supplied with energy from alternating current source 98 through slip ring 99 on the shaft 94. The stators 90' and 91' of the respective selsyn instruments are fixed relative to the craft and are connected by leads 100. In this instance, the rotor 101 of the selsyn receiver 91 is positioned directly by the control motor 33 of the system, the flexible shaft being eliminated, and is so arranged with respect to its stator 91' that the signal output of the receiver 91 is reversible in phase and proportional in amount to the angular displacement of the control surface 34. The magnitude of this signal for any position of the rotor 101 is varied by the transmitter 90, which alters the excitation of the winding 91' in accordance with the air speed of the craft and the adjusted follow-up signal is fed back to the pilot system as previously described in connection with Fig. 2. As shown herein, slip rings 102 and lead 103 are employed for this purpose. This follow-up signal is proportional to the displacement of the control surface multiplied by the output of the transmitter 90 of device 86, the resultant signal for controlling the motive means being inserted in the system in opposition to the input control signal which includes displacement, rate and acceleration components, which latter terms or either of them may be obtained as more fully described in the aforesaid applications or by any other angular rate signal producing means.

A modification of the follow-up signal-producing means and adjusting means for the type of pilot system illustrated in Fig. 7 is shown in Fig. 8. The selsyns 90 and 91 in this instance are replaced by potentiometers 105 and 106. Arm 107 of potentiometer 105 is positioned by the shaft 94 of the pressure responsive device 86. Potentiometer 106 is bridged by a resistor 108 and the bridge is supplied with energy by way of source 109. Potentiometer 105 adjusts the voltage applied across the displacement measuring bridge whose output is supplied as previously described in Fig. 2 to control motor 33 by way of lead 110 and lead 111 and slip ring 112. Arm 113 of potentiometer 106 is directly positioned by the output shaft 13 of the automatic pilot system, representing rudder position. In this instance, the resistors 84 and 85 control the output of the tubes 68 by means of the direct current follow-up grid signal.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A control system for dirigible craft including a movable control surface, an electric motor operatively connected to said surface, electrical means for providing a variable electrical input signal to operate said motor, means for producing a second electrical signal proportional to the force exerted by the motor in moving said surface, and means for feeding the signal of said producing means to said motor in opposition to the signal of said electrical input means.

2. In a system for positioning a movable object whose resistance to movement increases with displacement thereof from a normal position, a motor, means connecting the motor and object having a distortion proportional to the torque exerted by the motor on said object, and means providing a degenerative control signal for said motor having coupled parts respectively connected to the driving and driven end of said connecting means, said signal providing means having an output proportional to the relative displacement of the parts of said connecting means.

3. In a system for positioning a movable object whose resistance to movement increases with displacement thereof from a normal position, an electric motor means connecting the motor and object having a distortion proportional to the force exerted by the motor to move the object, and electrical means providing a degenerative control signal for said motor having coupled parts respectively connected to the driving and driven end of said connecting means, said signal providing means having an output proportional to the distortion in said connecting means.

4. A follow up control for automatic pilots having a servomotor comprising primary signal means for operating said motor, means for producing a second signal in accordance with a function of the power output of said motor, and means for feeding the second signal to said motor in opposition to the primary signal.

5. A follow up control for automatic pilots having an electric motor comprising electrical signal means for operating said motor, means for producing an electrical signal in accordance with the power output of said motor, and means for feeding the signal of said producing means to said motor in opposition to the signal of said operating means.

6. A control system for dirigible craft including a movable control surface, a motor operatively connected to said surface, electrical means for providing an input signal to operate said motor, means for producing an electrical follow up signal proportional to the extent of the movement of said surface by said motor, means for further adjusting the magnitude of said follow up signal in accordance with the air speed of the craft, and means for feeding said adjusted signal to said motor in opposition to said input signal.

7. A control system for dirigible craft including a movable control surface, a motor for moving the same, means for producing a signal varying with the departure of said craft from its normal attitude or heading, means for producing a second signal varying with the rate of change of attitude or heading, and means for producing a third signal proportional to the extent of movement of said surface, said motor being controlled by a combination of said displacement and rate signals, which combination is opposed by said third signal.

8. A control system for dirigible craft including a movable control surface, a motor for moving the same, means for producing a signal varying with the departure of said craft from its normal attitude or heading, means for producing a second signal varying with the rate of change of attitude or heading, means for producing a third signal varying with the angular acceleration of the craft, and means for producing a fourth signal proportional to the extent of movement of said surface, said motor being controlled by the combination of said displacement, rate and acceleration signals, which combination is opposed by said fourth signal.

9. A control system for dirigible craft including a movable control surface, a motor for moving the same, means for producing an electrical signal varying with the departure of said craft from its normal attitude or heading, means for producing a second electrical signal varying with the rate of change of attitude or heading, and means for producing a third electrical signal proportional to the torque exerted by said motor on said surface, said motor being controlled by a combination of said displacement, rate and torque signals.

10. A control system for dirigible craft including a movable control surface, a motor for moving the same, means for producing an electrical signal varying with the departure of said craft from its normal attitude or heading, means for producing a second electrical signal varying with the angular acceleration of the craft, and means for producing a third signal proportional to the torque exerted by said motor on said surface, said motor being controlled by a combination of said displacement, acceleration and torque signals.

11. In an automatic pilot for aircraft, a movable control surface, a motor for moving the same, means for producing a signal varying with the departure of the craft from a predetermined attitude or heading, means for producing a second signal varying with the rate of change of attitude or heading, means for producing a third signal proportional to the extent of movement of said surface away from norm, and means for modifying said third signal in accordance with the air speed of the craft, said motor being controlled by a combination of said displacement and rate signals, which combination is opposed by said modified third signal.

12. A control system comprising a control device, a servomotor, an elastic link interconnecting said servomotor and a load to be actuated, means responsive to movement of said control device for producing a first control signal voltage, means responsive to deformation of said elastic link for producing a second control signal voltage, means for algebraically adding said first and second control voltages to produce a resultant voltage and means for controlling said servomotor in accordance with said resultant voltage.

13. A control system for actuating a load in accordance with movement of a control device comprising a servomotor, a mechanical connection for transmitting operating force between said servomotor and said load, said connection being subject to elastic deformation when force is applied thereto, an electric signal generator actuated by said control device for producing a first reversible direction control voltage, an electric signal generator actuated in accordance with the elastic deformation of said mechanical connection for producing a second reversible direction control voltage, and a direction-sensitive electro-responsive device connected to be responsive to the resultant of said first and second control voltages for controlling the direction of movement of said servomotor.

14. In a control system for operating a control surface of an aircraft, a servomotor, an elastic linkage interconnecting said control surface and said servomotor, a first electric signal generator adapted to be actuated by a gyroscope, a second electric signal generator arranged to be actuated in accordance with the elastic deformation of said linkage when force is transmitted thereby between said control surface and said servomotor, and an electric-responsive device responsive to the differential output of said signal generators for controlling said servomotor.

15. A control system for actuating a load in accordance with movement of a control device comprising a servomotor, a mechanical connection for transmitting operating force between said servomotor and said load, said connection being subject to elastic deformation when force is applied thereto, an electric signal generator actuated by said control device for producing a first reversible polarity control voltage, an electric signal generator actuated in accordance with the elastic deformation of said mechanical connection for producing a second reversible polarity control voltage, an electroresponsive device responsive to the combined outputs of said signal generators for controlling said servomotor and means for adjusting the voltage gradient of one of said signal generators.

PERCY HALPERT.

REFERENCES CITED

The following references are of record in the file of this patent:

UNITED STATES PATENTS

| Number | Name | Date |
|---|---|---|
| 1,125,766 | Thompson | Jan. 19, 1915 |
| 1,703,317 | Minorsky | Feb. 26, 1929 |
| 1,988,458 | Minorsky | Jan. 22, 1935 |
| 2,028,374 | Anderson | Jan. 1, 1936 |
| 2,040,014 | Moseley | May 5, 1936 |
| 2,126,910 | Moseley | Aug. 16, 1938 |
| 2,159,142 | Fischer | May 23, 1939 |
| 2,176,807 | Wunsch | Oct. 17, 1939 |
| 2,204,290 | Alkan | June 11, 1940 |
| 2,349,663 | Langer | May 23, 1944 |
| 2,398,421 | Frische et al. | Apr. 16, 1946 |